Jan. 11, 1966 R. T. CORNELIUS 3,228,202
METHOD AND MEANS FOR MAKING CRACKED ICE AND THE LIKE
Filed Sept. 6, 1962 5 Sheets-Sheet 1
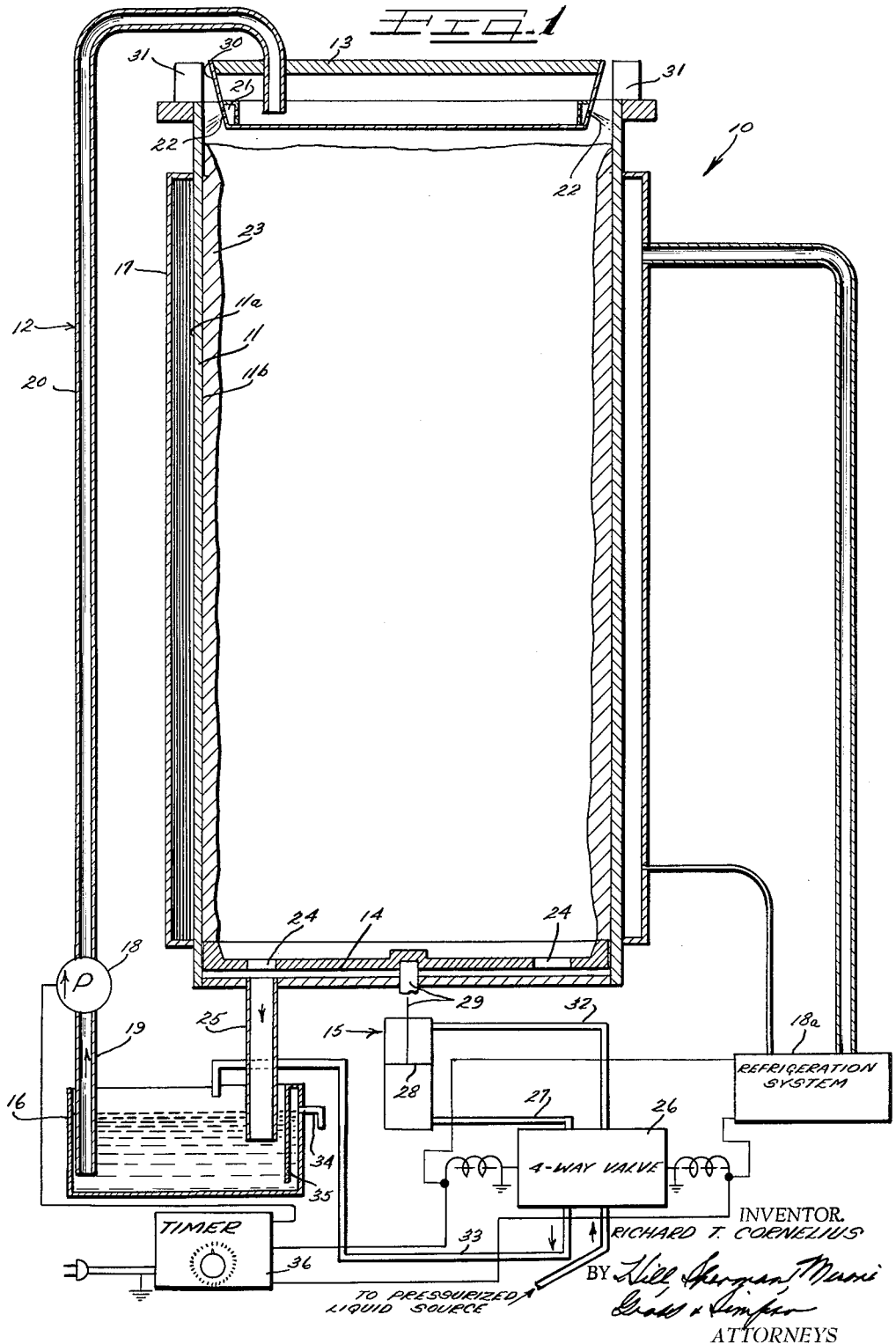
INVENTOR.
RICHARD T. CORNELIUS
BY
ATTORNEYS

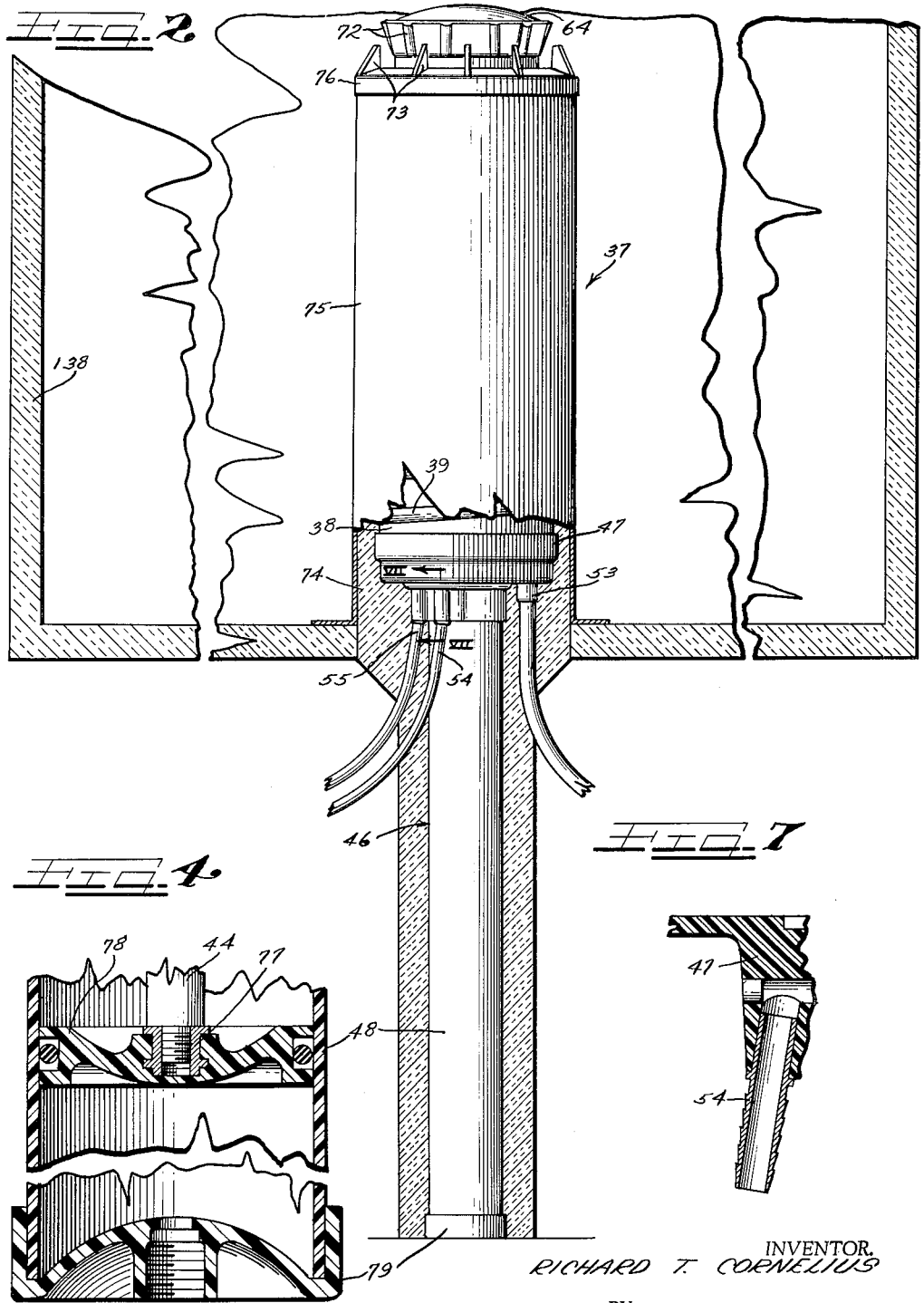

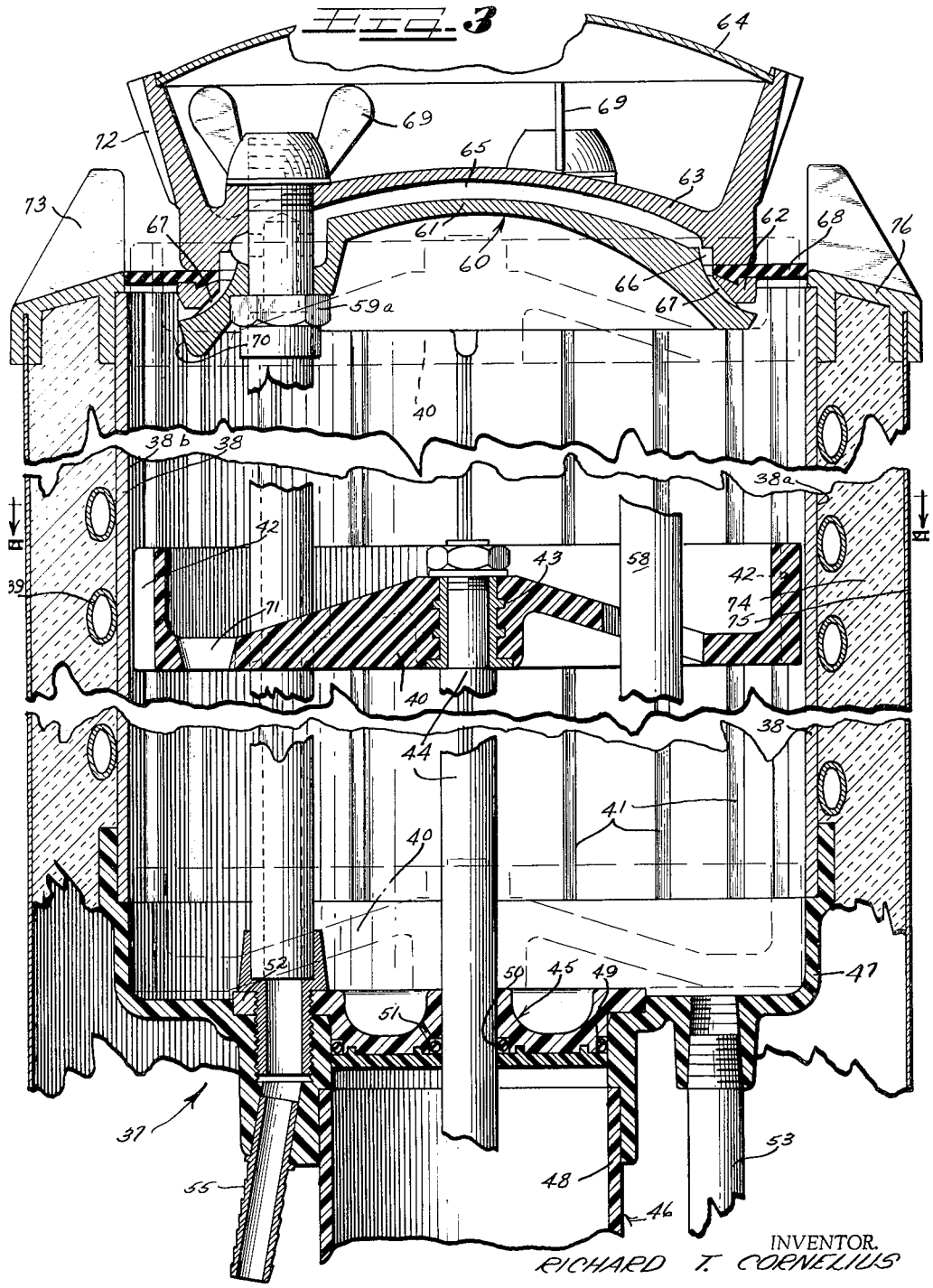

Jan. 11, 1966  R. T. CORNELIUS  3,228,202
METHOD AND MEANS FOR MAKING CRACKED ICE AND THE LIKE
Filed Sept. 6, 1962  5 Sheets-Sheet 4

INVENTOR.
RICHARD T. CORNELIUS
BY
ATTORNEYS

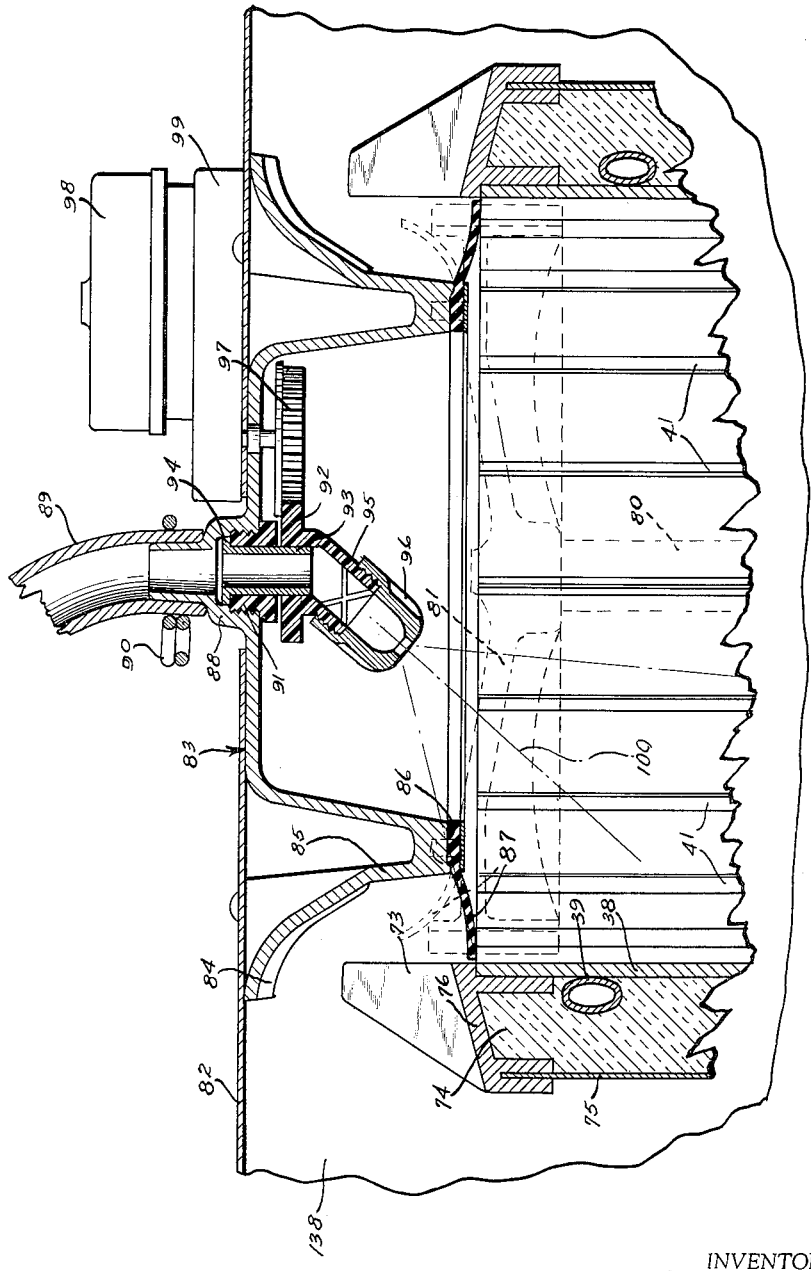

United States Patent Office 3,228,202
Patented Jan. 11, 1966

3,228,202
METHOD AND MEANS FOR MAKING
CRACKED ICE AND THE LIKE
Richard T. Cornelius, Minneapolis, Minn., assignor to The Cornelius Company, Anoka, Minn., a corporation of Minnesota
Filed Sept. 6, 1962, Ser. No. 221,811
20 Claims. (Cl. 62—71)

This invention relates generally to a method and means for freezing a liquid, and more specifically to a novel ice maker.

Although the principles of the present invention may be utilized to freeze various liquids, a particularly useful application is made when the same are applied to a method and means for making ice.

Prior art devices have had various disadvantages, among which are mechanical complexity, a great number of moving parts, high cost of manufacture, difficulty of maintenance, slowness of harvest cycle due to volume of liquid to be chilled, and the like. Further, the user market prefers crystal clear ice as distinguished from cloudy or snowy appearing products. Further, incidental to prolonged use, there is a tendency for foreign solids to collect, thereby requiring periodic shutdown or maintenance.

The present invention contemplates the provision of a method and means for freezing a liquid, such as for making ice, wherein all of the foregoing objections are eliminated for minimized. To that end, means are provided for freezing a recirculated spray of liquid on a member to form a frozen mass of predetermined maximum size which is ejected from the apparatus by a fluid actuator operated by the pressure under which the liquid, such as water, is received, the frozen mass being driven through a tortuous path that effects a breaking up of the same, and the liquid used to eject the frozen mass being thereafter employed to replenish the recirculating spray.

Accordingly, it is an object of the present invention to provide a novel method and means for making cracked ice and the like.

A further object of the present invention is to provide a machine for making cracked ice wherein the particles produced are hard, clear, and are substantially uniformly sized in all three dimensions.

Another object of the present invention is to provide a machine of the ice-maker type wherein no rotary motor is employed in the ice ejection mechanism.

Yet another object of the present invention is to provide a machine of the ice-maker type wherein pressurized liquid employed to eject a frozen mass is thereafter reused in making a subsequent batch of frozen material.

Yet another object of the present invention is to provide a machine of the ice-maker type which employs a fluid actuator to eject the finished frozen mass, such actuator volumetrically metering the total amount of liquid used per cycle.

A still further object of the present invention is to provide a machine of the ice-maker type which periodically cleanses itself of foreign solids which would otherwise accumulate.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 1 is a cross-sectional view of an ice making machine provided in accordance with the principles of the present invention, portions of the drawing being diagrammatic;

FIGURE 2 is an elevational view of a commercial embodiment of the ice making machine shown in FIGURE 1, portions of the figure being cross-sectioned;

FIGURE 3 is an enlarged cross-sectional view of the upper central portion of FIGURE 2, with portions thereof being broken away;

FIGURE 4 is an enlarged cross-sectional view of the lower central portion of FIGURE 2, portions thereof being broken away;

FIGURE 7 is a fragmentary enlarged cross-sectional view taken along VII—VII of FIGURE 2; and FIGURE 8 is a fragmentary cross-sectional view of a preferred modified form of this invention.

As shown on the drawings:

Figure 5:
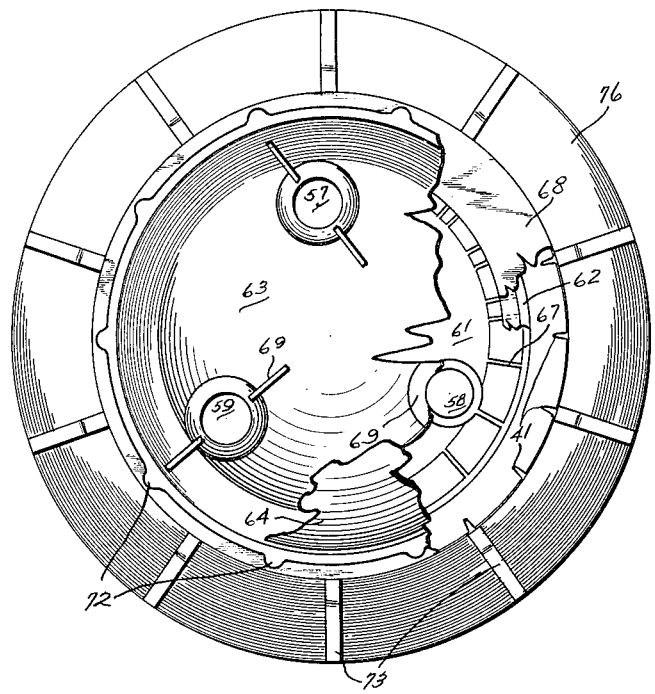
FIGURE 5 is a plan view in slightly reduced scale of the structure shown in FIGURE 3, portions thereof being broken away.
Figure 6:
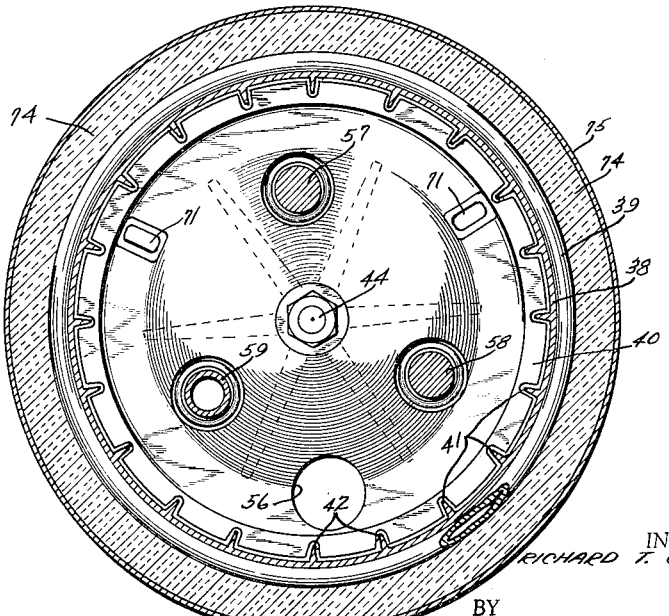
FIGURE 6 is a cross-sectional view taken along line VI—VI of FIGURE 3, in slightly reduced scale.

The principles of this invention are particularly useful when embodied in a machine for freezing a liquid, such as an ice making machine, such as illustrated in FIGURE 1, generally indicated by the numeral 10. The ice making machine 10 includes a refrigerated tubular member 11 provided with spray means generally indicated at 12 and including a hollow pressurized spray head 13, a reciprocable harvesting member 14, a fluid actuator 15, a reservoir 16, and appropriate controls.

The tubular member 11 has an outer surface 11a which is refrigerated to a temperature to bring the temperature of its inner surface 11b below the freezing point of the liquid. Thus, the tubular member 11 preferably is thermally conductive and is provided with a refrigeration coil or jacket 17 which is connected to a refrigeration system 18a. The refrigeration system 18a is conventional and is of the type which may be reversely operated to effect heating of the refrigeration coil 17, such being known in the art. The refrigeration coil 17 defines a refrigerated zone which extends downwardly because of the conductivity of the tubular member 11 to overlap the retracted position of the harvesting member 14 as shown. The refrigerated zone terminates in slightly spaced relation to the opposite end of the tubular member 11 so that there is no danger that the mouth thereof will freeze over.

The spray means 12 includes a recirculating pump 18 which has a suction line 19 which terminates in the reservoir 16 in the liquid in downwardly spaced relation from the upper part thereof, and in slightly upwardly spaced relation from the bottom thereof. The recirculating pump 18 discharges through a line 20 which communicates with the interior of the pressurized spray head 13, which is pressurized thereby with such liquid. The pressurized spray head 13 includes an annular passage 21 which communicates by apertures with the interior of the spray head 13, and which has discharge openings or orifices such as 22, 22, for discharging a spray of the liquid from the spray head 13 onto the interior surface of the tubular member 11.

The sprayed liquid flows down the interior of the tubular member 11, some of such liquid adhering to the interior thereof or adhering to ice previously formed thereon until a tubular mass 23 of ice or other frozen liquid is formed thereon. Any sprayed liquid not adhering drains downwardly through drain openings 24, 24 in the harvesting member 14 and is collected in the bottom of the tubular member 11 where the same drains through a drain pipe 25 which returns the same to the reservoir 16. Any solids, such as dirt or other foreign material, which may have been in the liquid when sprayed are continually washed down and returned through the drain 25 to the reservoir 16. By this mode of ice formation, a crystal clear (both dirt and air free) frozen mass is created. This mass is created in seating engagement with the harvesting member 14 as shown.

When a predetermined amount of ice has been formed, or when a predetermined temperature has been reached, the right side of a four-way valve 26 is energized which brings fluid pressure through a line 27 into the cap end of the actuator 15, for forcing its piston 28 and rod 29 in an upward direction. The rod 29 is connected to the harvesting member 14 to expel the frozen tubular mass 23 in an upward direction. Where the force available from the actuator 15 is inadequate to free the tubular mass 23, the controls which effect energizing of the right side of the four-way valve 26 may also be employed to effect reversal of the refrigeration system 18a there being a schematic control line shown from the right side of the solenoid valve 26 to the refrigeration system 18a for this purpose. Thus a hot gas defrosting may be applied briefly to the tubular member 11, and as soon as the frozen mass 23 is loosened, the fluid pressure acting on the piston 28 will immediately begin to effect harvesting or ejection of the frozen mass 23.

In its upward movement, the frozen mass 23 wedges into engagement with a breaker 30 which comprises a generally conical surface of the spray head 13. The breaker 30 has a larger diameter than the inside of the frozen mass 23 whereby stresses are applied to the frozen mass 23 to cause the same to break up into pieces. If desired, a series of flange-type cutters 31 may be employed to coact with the breaker 30 to further control and reduce the size of pieces produced.

Thereafter, the four-way valve 26 is reversely operated by deenergizing the right side thereof (and conventional reverse-refrigeration control means connected thereto) and by energizing the left side thereof and corresponding refrigeration controls for restoring the direction of refrigeration. Such energizing of the four-way valve effects admission of pressure to a line 32 by which the piston 28 is returned to its lowered position, and whereby the harvesting member 14 is returned from its upper extended position to its lower retracted position.

During both strokes of the piston 28, the liquid is discharged from the low-pressure side thereof through a line 33 which leads to the reservoir 16. The reservoir 16 has an overflow 34 which limits the amount of liquid that the reservoir 16 will retain. The difference in height between the bottom of the suction line 19 and the overflow 34, combined with the effective area of the reservoir 16, determines the maximum amount of liquid which may be withdrawn and deposited in a frozen state. (Although the thickness of the frozen mass 23 is representative of a condition reached near the end of a freezing portion of a cycle, the reservoir 16 has been illustrated as being full, such as obtains at the beginning of a freezing cycle, for purpose of illustration.) If for any reason the control system should fail to stop the pump 18 at the proper time, the pump 18 will thus be incapable of effecting a spraying of more than the predetermined volume of liquid. If for any reason the frozen mass 23 should not become ejected as by sticking, such sticking also precludes movement of the piston 28 and hence precludes a replenishing of the liquid in the reservoir 16.

The reservoir 16 preferably includes a vented baffle 35 which terminates in slightly spaced relation from the bottom of the reservoir, at a height below the bottom of the suction line 19. Any solids returned through the drain 25 will thus collect on the bottom of the reservoir. When replenishing liquid is added to the reservoir, an amount is preferably added which is greater than that needed to raise the level to that of the drain pipe 34 whereby the surplus will be compelled to flow around the bottom of the baffle 35, thus washing out solids with it through the overflow drain 34. Thus, a cleaning action occurs at the bottom of the reservoir 16 for each harvest cycle.

Although the actuator 15 is not drawn to scale, it is preferred that it be sized so that its liquid displacement in one complete cycle will be that needed per harvest cycle including that required to flush the reservoir 16. If the drain pipe 34 and the baffle 35 are omitted, the actuator 15 will nevertheless continue to define and meter the quantity of liquid needed and available for the next harvest cycle.

No particular form of control system is essential to a practice of the instant invention. However, there is disclosed in FIGURE 1 an electric timer control 36 of the repeating sequence-switch type which has a requisite number of circuits to effect cooling by the refrigeration system 18a, retraction of the actuator 15, and operation of the pump 18 simultaneously. After a predetermined time, namely when a predetermined level just above the bottom of the inlet pipe 19 is reached, which level may be sensed by a liquid level float switch of a known type, the refrigeration system 18a is reversed by the control 36 to provide hot gas defrost and the four-way valve 26 is reversed to effect raising of the harvest member 14, and the pump 18 is stopped. No rotary motor is employed in the actual harvesting of the frozen mass 23, whereby a basically simple structure is provided. Instead, the pressure available such as in the water mains is employed to effect the mechanical work of the harvest cycle.

Referring to FIGURES 2–7, there is shown a commercial-type of embodiment of the structure shown in FIGURE 1, various controls and circuitry not being duplicated.

The machine 10 for freezing a liquid, such as an ice maker, here includes an ice tube assembly generally indicated at 37 disposed in an insulated bin 138 and projecting downwardly therefrom. As best seen in FIGURE 3, the ice tube assembly 37 includes a thermally conductive tubular member 38 which has a refrigerated zone defined by a refrigeration coil 39 on the outside of the tubular member 38. The refrigerated zone 39 extends at its lower end into overlapping relationship with the retracted position of a harvesting member 40 for creating a frozen mass in seated engagement therewith. The refrigeration coil 39 acts on the outer surface 38a of the tubular member 38 to keep it at a sufficiently low temperature so that the inner surface 38b thereof is below the freezing point of the liquid. The upper end of the tubular member 38, which constitutes the discharge end thereof, is a non-refrigerated zone, in that the same is at a temperature above the freezing point of the liquid. The tubular member 38 preferably comprises an aluminum extrusion, and is provided with a set of inwardly radially directed fins 41, all of which are seen in cross-section in FIGURE 6. The fins 41 extend in a direction parallel to the axis of the tubular member 38, and also extend in a radial direction, here shown to be radially inward. The spray freezes on the main body and on the fins of the tubular member 38 whereby axial lines of stress concentration are formed in the tubular ice body which constitute prospective lines of separation or weakness, or fracture lines, defined and effected by such fins. The harvesting member 40 is peripherally slotted as at 42 to receive the fins 41.

The harvesting member 40 in this embodiment comprises molded plastic and is provided with a load-distributing insert 43 which is held securely on the end of a piston rod 44 which extends through a gland assembly 45 into an actuator generally indicated at 46. A lower housing 47, such as of plastic, is secured as by an epoxy cement to the tubular member 38 and to a cylinder 48 of the actuator 46. The gland 45 thus serves to define the rod end of the actuator 46 and also to close the lower end of the tubular member 38.

The gland 45 comprises a pair of plastic elements secured together as by solvent cement and removably received as a unit in the housing 47. The gland 45 has an outer O-ring 49 forming a seal with the housing 47 and an inner O-ring 50 forming a sliding seal with the rod 44. If desired, a vent 51 may be provided to add liquid lubrication to the O-ring 50. The gland 45 is provided with three clamping ears 52 through which threaded means extend for clamping the gland 45 positively against the lower interior upwardly directed surface of the housing 47. These threaded means preferably comprise aluminum and are explained more fully below. The housing 47 is provided with a drain opening and fitting 53 corresponding to the drain 25, an actuator inlet and fitting 54 shown in FIGURE 7, and a spray head inlet 55 shown in FIGURE 3. For convenience, the drain fitting 53 has been illustrated in FIGURE 3 and in FIGURE 2 in a rotated position, but may be disposed directly beneath a drain opening 56 in the harvesting member 40, which is removed from FIGURE 3 due to cross-sectioning.

There is provided a group of three elongated studs 57, 58, and 59, each comprising aluminum. These studs have a length greater than the axial length of the tubular member 38 and extend beyond it at both ends, the studs 57–59 being externally threaded at both ends. The lower ends of the studs 57–59 pass through ears such as 52 in the gland 45, from which they respectively extend upwardly where each is provided with a hexagonal surface such as 59a for tightening the threads into the plastic housing 47. At their upper ends, the studs 57–59 are provided with shoulders on which a spray head assembly 60 rests. The spray head assembly 60 includes a lower orifice ring 61, an upper orifice ring 62, a cap 63, and a cover 64. The lower orifice ring 61 and the cap 63 jointly define a pressurized spray head chamber 65 which communicates at its periphery with an annular passage 66, from which extends a number of spray openings 67 defined by generally radially extending slots in one of the members 61, 62. An annular resilient member 68 is clamped between the upper orifice ring 62 and the cap 63, thereby extending from the spray head 60 in a radial direction toward the tubular member 38, and being secured to one of such members at its periphery. The upper ends of the studs 57–59 pass through the several members 61, 62, 63, and 68 which are secured together in a sandwich relation by a set of wing nuts 69 received on the upper ends of the studs 57–59. The stud 59 is axially hollow, except for a closed upper end, so that at its lower end it communicates with the spray inlet 55, it being cross-drilled at its upper end to communicate with the spray head chamber 65.

The lower peripheral edge of the member 61 is provided with a number of lead-in or cam surfaces 70 which guide the upper end of the harvesting member 40 as it reaches its extended position wherein it extends upwardly of the upper end of the tubular member 38 as shown in dashed lines. The harvesting member 40 is provided with a clearance opening 71 to receive such lead-in surfaces 70, and with other openings through which the studs 57–59 pass.

The spray head 60 is provided with a series of ridges 72 which jointly define a surface of revolution of generally conical configuration which is received a short distance into the frozen tubular mass and into a wedging relationship therewith. Cooperating therewith, there is provided a series of reaction flanges or cutters 73 which jointly define a generally cylindrical surface, concentric to and radially spaced from the conical surface on the spray head 60, the flanges 73 being angularly spaced between the ridges 72.

The refrigeration coil tubing 39 is elliptical in cross-section and is brazed to the outer surface of the tubular member 38. The elliptical tubing 39 is further enclosed by thermal insulation 74 such as polyurethane which, in turn, is jacketed by a sleeve 75 such as of stainless steel. A cap 76 telescopes with the tubular member 38 and the sleeve 75, enclosing the insulation 74, and comprises a support for the flanges 73 which may be made integral with the cap 76.

The resilient annular member 68 preferably comprises rubber and serves several purposes. As to ice which has been ejected past it by the harvesting member 40, it serves as a check valve. In its closed position to prevents entry of atmospheric dirt and dust to the interior of the tubular member 38. In its closed position it prevents egress of spray or mist from the various spray openings 67. During ice ejection it aids the series of ridges 72 and reaction flanges 73 in breaking up the ice.

The insulation 74, as best seen in FIGURE 2, extends in a downward direction and surrounds the stationary cylinder 48 of the actuator 46. Although the insulation material 74 has heat-insulation properties, it is used around the cylinder 48 for structural support and is readily applied at one time to the entire tubular assembly.

Referring to FIGURE 4, the lower end of the actuator 46 is illustrated. The piston rod 44, such as of aluminum, is threadably secured to an insert 77 in a molded plastic piston 78, while the lower end of the cylinder 48 is closed by a plastic cap 79 which is secured thereto as by solvent cement, and which cap 79 is suitably threaded for connection to the four-way valve 26.

As best seen in FIGURE 5, each of the flanges 73 is aligned with one of the fins 41, and each of the ridges 72 is not only disposed angularly intermediate the flanges 73 but is aligned with other of the fins 41.

The operation of this form of the invention has been described above in connection with the description of FIGURE 1.

The form of the invention shown in FIGURES 2–6 is further advantageous in that all of the moving parts may be removed for cleaning or replacement through the upper end. After the cap 64 has been removed, the wing nuts 69 may be loosened, thereby enabling removal of the components of the pressurized spray head 60. The studs 57–59 may then be loosened by a tool applied to their upper ends and removed. The clearances in the harvesting member 40 are adequate to enable such removal. Their removal enables the removal of the harvesting head 40, piston rod 44, gland 45, and piston 78 as a unit, thereby exposing the entire interior of the assembly 37 for access from above.

Referring to FIGURE 8, there is shown a preferred form or embodiment of the invention, various controls and circuitry not being duplicated.

This structure is substantially the same as that shown in FIGURE 3 except that the studs 57–59 and the spray head assembly 60 have been omitted.

The embodiment shown in FIGURE 8 includes the tubular member 38 having the refrigeration coil 39 and the ribs 41, surrounded by the thermal insulation 74 which is jacketed by the sleeve 75, the upper end of which tubular member and sleeve are enclosed by the cap 76 having the series of reaction flanges 73, all as described before. The fluid actuator is provided with a stainless steel piston rod 80 to which is attached a harvesting member 81 having a drain hole as described for the harvesting member 40, but not requiring stud clearance holes. The insulated bin 138, shown in FIGURE 2, is provided with a top or cover 82, shown in FIGURE 8, to which there is attached a spray head assembly 83 having ridges 84 similar to the ridges 72 for coaction with the reaction flanges 73. The ridges 84 are carried on a breaker cone 85 which has a downwardly directed annular surface 86 to which an annular resilient member 87, corresponding to the annular member 68, is attached.

The breaker cone 85 has a hollow central boss 88 which is adapted at its upper end to be received into a supply hose 89 which is clamped thereto by a spring clamp 90. The hose 89 communicates with or is functionally equivalent to the line 20 shown in FIGURE 1. The hollow boss 88 is internally threaded and receives a nylon bearing 91 of the bushing type. Immediately beneath the nylon bearing 91, there is disposed a plastic spur gear 92 into which is pressed or molded a brass shaft 93 which is hollow and which has a flange 94 at its upper end supported by the upper end of the nylon bearing 91. To the plastic gear 92 there is molded a downwardly and radially outwardly directed hollow extension 95 which is externally threaded in this embodiment and which threadably engages and supports a nozzle tip 96. The extension 95 may be grooved or scored as desired to control and distribute internal water flow. The plastic gear 92 is driven by a further plastic spur gear 97 which is slowly rotated by an electric motor 98 acting on the gear 97 through its internal gear train 99. The motor and gear train assembly 98 and 99 are commercially available and of a known type, such being commonly employed in many applications such as timer drives.

The motor 98 is energized with the pump 18 so that the nozzle tip 96 is gradually rotated about a central axis, and the spray discharged therefrom has a conical configuration as indicated at 100, the numeral indicating the centerline of the cone. It will be noted that the upper half of the conical spray impinges against the tubular freezing member 38 near the top thereof, and that the bottom half of the conical spray extends downwardly so that its lower edge is directed substantially at the lower end of the tubular member 38. This type of arrangement assists in obtaining a tubular mass of ice the thickness of which is substantially uniform throughout the length of the tubular member 38.

By lifting the top or cover 82, the spray head assembly 83 is removed with it, thereby providing ready access to the interior of the tubular member 38 for cleaning and the like. Upon removal of the harvesting member 81 from the shaft 80, there is ready access to the gland 45 shown in FIGURE 3, which in the embodiment shown in FIGURE 8 is threaded into the housing 47.

The broad principles underlying my invention may be practiced by other structures, and to that end I wish to point out that my invention includes the steps of continually directing a spray of liquid onto a member whose temperature is below the freezing point of the liquid to form a frozen mass. Unless the frozen mass is released by some other means, it is necessary to heat the member slightly above the freezing point of the liquid to free the mass therefrom. Thereafter, the frozen mass may be forced out through a tortuous path such as defined by the flanges or cutters 73 and 31 and conical means 30 and 72 to break up the frozen mass. This may be assisted by the creation or making of the frozen mass with fracture lines of reduced thickness or of weakness whereby stress concentration is effected. Such removal is preferably effected by utilization of additional pressurized fluid which is thereafter added to the liquid being sprayed to replenish it.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A machine for freezing a liquid, comprising in combination:
   (a) a member constructed to be operatively associated with refrigeration means for being refrigerated to a temperature below the freezing point of the liquid;
   (b) means for providing a spray of the liquid onto said member;
   (c) a reservoir arranged to collect such sprayed liquid and any foreign solids as adhere to neither said member nor to frozen liquid, and said reservoir also comprising means to supply liquid to said spray means, said reservoir having means by which any such foreign solids received therein are rinsed overboard once per harvest cycle;
   (d) a harvesting member operative on the frozen liquid to displace it from said first-named member;
   (e) a fluid actuator drivably connected to said harvesting member for reciprocably driving the same and constructed to be connected to and driven by a pressurized supply of said liquid; and
   (f) means for conducting liquid discharged from said actuator to said reservoir.

2. A machine for freezing a liquid, comprising in combination:
   (a) a member constructed to be operatively associated with refrigeration means for being refrigerated to a temperature below the freezing point of the liquid;
   (b) means for providing a spray of the liquid onto said member;
   (c) a reservoir arranged to collect such sprayed liquid as adheres to neither said member nor to frozen liquid, said reservoir being operative in cooperation with said spray means to define a maximum predetermined amount of liquid which can be withdrawn by said spray means and be frozen on said member per harvest cycle regardless of the duration thereof;
   (d) a reciprocably driven harvesting member operative on the frozen liquid to displace it from said first-named member; and
   (e) means for replenishing said maximum predetermined amount of liquid in said reservoir only once per harvest cycle.

3. A machine for freezing a liquid, comprising in combination:
   (a) a member constructed to be operatively associated with refrigeration means for being repeatedly refrigerated thereby to temperatures respectively below and above the freezing point of the liquid;
   (b) means for providing a spray of the liquid onto said member;
   (c) a reservoir arranged to collect such sprayed liquid and any foreign solids as adhere to neither said member nor to frozen liquid, and said reservoir also comprising means to supply liquid to said spray means, said reservoir being constructed to have any such foreign solids received therein rinsed overboard once per harvest cycle, said reservoir being operative in cooperation with said spray means to define a maximum predetermined amount of liquid which can be withdrawn by said spray means and be frozen on said member per harvest cycle regardless of the duration thereof;
   (d) a harvesting member operative on the frozen liquid to displace it from said first-named member, in response to the temperature of the interface between said first-named member and the frozen liquid being above the freezing point of such liquid;
   (e) a fluid actuator drivably connected to said harvesting member for reciprocably driving the same and constructed to be connected to and driven by a pressurized supply of the liquid, said actuator defining and employing a predetermined quantity of liquid which quantity corresponds to that required per harvest cycle; and
   (f) means for conducting liquid discharged from said actuator to said reservoir.

4. A machine for freezing a liquid, comprising in combination:
   (a) a tubular member constructed to be operatively asassociated with refrigeration means for being refrigerated to a temperature below the freezing point of the liquid;
(b) means for providing a spray of the liquid onto said member for creating a frozen tubular mass thereof;
(c) a reciprocably driven harvesting member operative on the frozen tubular mass to displace it as a unit from its freezing position on said tubular member; and
(d) a breaker having a generally conical surface wedgingly engageable with the inner surface of one end of the frozen tubular mass, and operative to break it up in response to movement thereof against said generally conical surface.

5. A machine for freezing a liquid, comprising in combination:
(a) a tubular member constructed to be operatively associated with refrigeration means for being refrigerated to a temperature below the freezing point of the liquid;
(b) means for providing a spray of the liquid onto said member for creating a frozen tubular mass thereof;
(c) a reciprocably driven harvesting member operative on the frozen tubular mass to displace it as a unit from its freezing position on said tubular member;
(d) a breaker having a series of ridges arranged to jointly define a generally conical surface wedgingly engageable with the inner surface of one end of the frozen tubular mass; and
(e) a series of reaction flanges arranged to jointly define a generally cylindrical surface concentric with and radially spaced from said generally conical surface, said flanges being respectively disposed angularly between said ridges and operative therewith to break up the frozen tubular mass in response to movement thereof against said ridges and flanges.

6. A machine for freezing a liquid, comprising in combination:
(a) a tubular member constructed to be operatively associated with refrigeration means for being refrigerated to a temperature below the freezing point of the liquid;
(b) means including a pressurized spray head for providing a spray of the liquid onto said member for creating a frozen tubular mass thereof;
(c) a separate harvesting member driven only in a direction parallel to the axis of said tubular member and directly operative on the entire frozen tubular mass to displace it as a unit from its freezing position on said tubular member; and
(d) a breaker comprising a fixed generally conical surface on said spray head, and wedgingly engageable with the frozen tubular mass, and operative to break it up in response to movement thereof against said generally conical surface.

7. A machine for freezing a liquid, comprising in combination:
(a) a tubular member constructed to be operatively associated with refrigeration means for being refrigerated to a temperature below the freezing point of the liquid;
(b) means including a spray head for providing a spray of the liquid onto said member;
(c) a harvesting member concentric with said tubular member and operative on the frozen liquid to displace it from said tubular member;
(d) a fluid actuator having a stationary cylinder and a reciprocable piston and rod drivably connected to said harvesting member for reciprocably driving the same; and
(e) a unified mass of rigid insulation material thermally insulating said refrigerated tubular member and mechanically supporting said stationary cylinder.

8. A machine for freezing a liquid, comprising in combination:
(a) a tubular member constructed to be operatively associated with the refrigeration means for being refrigerated to a temperature below the freezing point of the liquid;
(b) means for providing a spray of the liquid onto said member for creating a frozen tubular mass thereof, said means including a hollow spray head supported in a fixed position by fixed hollow stud means extending through said tubular member and connected to supply pressurized liquid thereto; and
(c) a reciprocably driven harvesting member operative on the frozen tubular mass to displace it axially as a unit from its freezing position within said tubular member.

9. A machine for freezing a liquid, comprising in combination:
(a) a thermally conductive tubular member constructed to be operatively associated with refrigeration means for being refrigerated at one surface to reduce the temperature of its opposite surface below the freezing point of the liquid;
(b) a set of radially directed fins carried on said opposite surface and extending in a direction parallel to the axis of said tubular member;
(c) means for providing a spray of the liquid onto said opposite surface of said tubular member for creating a frozen tubularly disposed mass having prospective lines of separation defined by said fins;
(d) a reciprocably driven harvesting member operative on the frozen liquid to displace it from said refrigerated member, said harvesting member being slotted to receive said fins; and
(e) a breaker having a generally conical surface wedging engageable with the frozen liquid, and operative to break it up in response to movement thereof against said generally conical surface.

10. A machine for freezing a liquid, comprising in combination:
(a) a thermally conductive tubular member constructed to be operatively associated with refrigeration means for being refrigerated at one surface to reduce the temperature of its opposite surface below the freezing point of the liquid;
(b) a set of radially directed fins carried on said opposite surface and extending in a direction parallel to the axis of said tubular member;
(c) means for providing a spray of the liquid onto said opposite surface of said tubular member for creating a frozen tubularly disposed mass having prospective lines of separation defined by said fins;
(d) a reciprocably driven harvesting member operative on the frozen liquid to displace it from said refrigerated member, said harvesting member being slotted to receive said fins;
(e) a breaker having a series of ridges arranged to jointly define a generally conical surface wedgingly engageable with the frozen liquid and angularly aligned with certain of said fins; and
(f) a series of reaction flanges arranged to jointly define a generally cylindrical surface concentric with and radially spaced from said generally conical surface, said flanges being respectively disposed angularly between said ridges in angular alignment with other of said fins, and operative with said flanges to break up the frozen liquid in response to movement thereof against said ridges and flanges.

11. A machine for freezing a liquid, comprising in combination:
(a) a thermally conductive tubular member having a zone constructed to be operatively associated with refrigeration means for being refrigerated at its outer surfaces to reduce the temperature of its inner surface below the freezing point of the liquid;
(b) a set of radially inwardly directed fins integral with the inner surface of said tubular member and extending in a direction parallel to the axis thereof;
(c) means for providing a spray of liquid onto said inner surface, said means including a spray head supported above said tubular member and connected to receive pressurized liquid for creating a frozen tubularly disposed mass having prospective lines of separation defined by said fins;
(d) a reciprocable harvesting member disposed and arranged to be reciprocably driven between a normally retracted stationary position and an extended position, and operative upon movement toward the extended position to displace the frozen tubular mass axially as a unit from its freezing position within said tubular member, said refrigerated zone overlapping said retracted position of said harvesting member, whereby the tubular mass is created in a seated condition against said harvesting member, said harvesting member being slotted to receive said fins;
(e) a fluid actuator having a stationary cylinder and a reciprocable piston and rod drivably connected to said harvesting member for reciprocably driving the same;
(f) a mass of rigid insulation material thermally insulating said refrigerated tubular member and mechanically supporting said stationary cylinder;
(g) a flexible annular member comprising resilient material disposed between said spray head and said tubular member, secured to said spray head, and returnably yieldably in response to displacement of the frozen tubular mass;
(h) a breaker having a series of ridges arranged to jointly define a generally conical surface wedgingly engageable with the frozen tubular mass and angularly aligned with certain of said fins; and
(i) a series of reaction flanges arranged to jointly define a generally cylindrical surface concentric with and radially spaced from said generally conical surface, said flanges being respectively disposed angularly between said ridges in angular alignment with other of said fins, and operative with said flanges to break up the frozen tubular mass in response to movement thereof against said ridges and flanges.

12. A method for making cracked ice from a liquid, comprising:
(a) directing a spray of liquid onto a member whose temperature is below the freezing point of the liquid to form a frozen mass;
(b) thereafter, utilizing a predetermined quantity of additional pressurized liquid to effect forcing the frozen mass from the member and through a stress and strain-applying path to break up the frozen mass; and
(c) thereafter adding said additional pressurized liquid to the liquid being sprayed to replenish it.

13. A machine for freezing a liquid to be obtained from a pressurized source thereof, comprising in combination:
(a) a member, constructed to be operatively associated with refrigeration means, for being refrigerated to a temperature below the freezing point of the liquid;
(b) means including a pressurized-spray head constructed to be connected to said source and operative to provide a spray of the liquid directly onto said member;
(c) a separate harvesting member directly engageable with the frozen liquid and operative on the frozen liquid directly carried by said refrigerated member to displace the frozen liquid from said refrigerated member; and
(d) a fluid actuator drivably secured to said separate harvesting member for reciprocably driving the same and being constructed to be connected to and driven by pressurized liquid from said source.

14. A machine for freezing a liquid, comprising in combination:
(a) a member, constructed to be operatively associated with refrigeration means, for being refrigerated to a temperature below the freezing point of the liquid;
(b) means for discharging the liquid directly onto said member;
(c) a separate harvesting member directly engageable with the frozen liquid and operative on the frozen liquid directly carried by said first-named member to displace the frozen liquid from said first-named member;
(d) a fluid actuator drivably secured to said harvesting member for reciprocably driving the same and constructed to be connected to and driven by a pressurized supply of said liquid; and
(e) means for conducting liquid discharged from said actuator to said first-named means whereby the amount of liquid delivered to said first-named means is metered by said actuator.

15. A machine for freezing a liquid, comprising in combination:
(a) a member, constructed to be operatively associated with refrigeration means, for being refrigerated to a temperature below the freezing point of the liquid;
(b) means for discharging the liquid directly onto said member,
(c) a separate harvesting member directly engageable with the frozen liquid and operative on the frozen liquid directly carried by said first-named member to displace the frozen liquid from said first-named member;
(d) a fluid actuator drivably secured to said harvesting member for reciprocably driving the same and constructed to be connected to and driven by a pressurized supply of said liquid; said actuator defining and employing a predetermined quantity of liquid which quantity corresponds to that required per harvest cycle; and
(e) means for conducting liquid discharged from said actuator to said first-named means.

16. A machine for freezing a liquid, comprising in combination:
(a) a member, constructed to be operatively associated with refrigeration means, for being refrigerated to a temperature below the freezing point of the liquid;
(b) means for discharging the liquid directly onto said member;
(c) a reservoir arranged to collect such discharged liquid as adheres to neither said member nor to frozen liquid, and said reservoir also comprising means to supply liquid to said discharging means;
(d) a separate harvesting member directly engageable with the frozen liquid and operative on the frozen liquid directly carried by said first-named member to displace the frozen liquid from said first-named member;
(e) a fluid actuator drivably secured to said harvesting member for reciprocably driving the same and constructed to be connected to and driven by a pressurized supply of said liquid, said actuator defining and employing a predetermined quantity of said liquid, which quantity corresponds to that required to be frozen per harvest cycle; and
(f) means for conducting the liquid discharged from said actuator to said reservoir.

17. A machine for freezing a liquid, comprising in combination:
(a) a tubular member, constructed to be operatively associated with refrigeration means, for being refrigerated to a temperature below the freezing point of the liquid;

(b) means including a pressurized-spray head for discharging a spray of the liquid directly onto said member for creating a frozen tubular mass thereof;

(c) a separate reciprocably driven harvesting member directly engageable with and operative on the frozen tubular mass to displace the frozen liquid from said tubular member; and (d) a flexible annular member comprising resilient material disposed between said spray head and said tubular member, secured to one of said spray head and said tubular member, normally blocking the escape of spray past the adjacent end of said member, and being returnably yieldable in response to such displacement of the frozen tubular mass past said end of said member.

18. A machine for freezing a liquid, comprising in combination:
(a) a tubular member, constructed to be operatively associated with refrigeration means, for being refrigerated to a temperature below the freezing point of the liquid;
(b) means for providing a spray of liquid directly onto said member for creating a rigid frozen tubular mass thereof, said means including a driven pressurized-spray nozzle which is vertically stationary and rotatably directed to spray a portion of the interior of said member; and
(c) a separate harvesting member driven only in a direction parallel to the axis of said tubular member and directly operative on the rigid frozen tubular mass to displace it as a unit from its freezing position and to displace it axially from said tubular member.

19. A machine for freezing a liquid, comprising in combination:
(a) a tubular member, constructed to be operatively associated with refrigeration means, for being refrigerated to a temperature below the freezing point of the liquid;
(b) means for providing a spray of liquid directly onto said member for creating a rigid frozen tubular mass thereof, said means including a driven spray nozzle having a vertical rotational axis and disposed at the upper end of said member and constructed to provide a generally conical spray pattern whose central axis is directed downwardly and radially outwardly from said rotational axis to spray a portion of the interior of said member; and (c) a separate harvesting member concentric with said tubular member and driven only in a direction parallel to the axis of said tubular member and directly operative on the rigid frozen tubular mass to displace it as a unit from its freezing position and axially from said tubular member.

20. A machine for freezing a liquid, comprising in combination:
(a) a thermally conductive tubular member, constructed to be operatively associated with refrigeration means, for being refrigerated at one surface to reduce the temperature of its opposite surface below the freezing point of the liquid;
(b) a set of fins of solid cross-section carried on said opposite surface and extending in a direction parallel to the axis of said tubular member and being radially directed for a distance approximating the ultimate thickness of the frozen liquid;
(c) means for providing a spray of liquid onto said opposite surface of said tubular member; and
(d) a reciprocably driven harvesting member concentric with said tubular member and operative on the frozen liquid to displace it from said refrigerated member, said harvesting member having a set of circularly arranged radial slots receiving said fins.

References Cited by the Examiner
UNITED STATES PATENTS

| | | | |
|---|---|---|---|
| 763,090 | 6/1904 | Crane | 62—71 |
| 1,878,759 | 9/1932 | Capeman | 62—72 |
| 1,965,901 | 7/1934 | Lindsey | 62—71 |
| 2,071,465 | 2/1937 | Huber | 62—348 |
| 2,303,664 | 12/1942 | Short. | |
| 2,598,429 | 5/1952 | Pownall | 62—106 X |
| 2,639,594 | 5/1953 | Watt | 62—71 X |
| 2,735,275 | 2/1956 | Branchflower | 62—71 X |
| 2,763,996 | 9/1956 | Lees | 62—71 |
| 2,770,102 | 11/1956 | Roedter | 62—434 X |
| 2,919,557 | 1/1960 | Lees | 62—71 |
| 2,927,439 | 3/1960 | Polk | 62—345 X |
| 2,927,440 | 3/1960 | Kohl | 62—352 X |
| 2,943,462 | 7/1960 | Wolferman | 62—354 |
| 2,990,692 | 7/1961 | Hubacker et al. | 62—71 |
| 3,008,301 | 11/1961 | Baillif et al. | 62—137 X |

ROBERT A. O'LEARY, *Primary Examiner.*

MEYER PERLIN, *Examiner.*